(12) United States Patent
Mercier

(10) Patent No.: US 8,360,440 B2
(45) Date of Patent: Jan. 29, 2013

(54) CONTROL SYSTEM FOR LEANING VEHICLE

(75) Inventor: Daniel Mercier, Magog (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/541,804

(22) Filed: Jul. 5, 2012

(65) Prior Publication Data

US 2012/0267870 A1    Oct. 25, 2012

Related U.S. Application Data

(60) Continuation of application No. 13/356,985, filed on Jan. 24, 2012, now Pat. No. 8,235,398, which is a division of application No. 12/501,025, filed on Jul. 10, 2009, now Pat. No. 8,123,240.

(51) Int. Cl.
*B62D 9/02* (2006.01)

(52) U.S. Cl. ......... 280/5.509; 280/124.103; 280/93.512; 180/210

(58) Field of Classification Search ........... 280/5.505, 280/5.51, 5.509, 5.508, 124.103, 5.5, 5.506, 280/6.154, 5.507; 180/210, 211
See application file for complete search history.

(56) References Cited

U.S. PATENT DOCUMENTS

| | | | | |
|---|---|---|---|---|
| 2,063,704 A | * | 12/1936 | Slack | 280/86.754 |
| 2,150,199 A | * | 3/1939 | Weston | 280/124.103 |
| 2,256,366 A | * | 9/1941 | Weston | 280/124.103 |
| 2,260,102 A |   | 10/1941 | Freret | |
| 2,417,316 A | * | 3/1947 | McFarland | 280/124.138 |
| 2,449,306 A | * | 9/1948 | Leighton | 280/124.144 |
| 2,843,396 A | * | 7/1958 | Lucien | 280/6.159 |
| 3,547,466 A | * | 12/1970 | Millican | 280/5.508 |
| 3,704,897 A |   | 12/1972 | Bagge et al. | |
| 4,632,413 A | * | 12/1986 | Fujita et al. | 280/124.103 |
| 4,659,106 A | * | 4/1987 | Fujita et al. | 280/124.103 |
| 4,685,690 A | * | 8/1987 | Fujita et al. | 280/124.103 |
| 4,951,959 A | * | 8/1990 | Watanabe et al. | 280/124.136 |
| 5,116,069 A |   | 5/1992 | Miller | |
| 5,765,846 A | * | 6/1998 | Braun | 280/124.103 |
| 5,927,424 A |   | 7/1999 | Van Den Brink | |

(Continued)

FOREIGN PATENT DOCUMENTS

| | | |
|---|---|---|
| DE | 905577 C | 3/1954 |
| EP | 0251906 A1 | 1/1988 |

(Continued)

OTHER PUBLICATIONS

International Search Report of PCT/US2009/064568; Apr. 13, 2010; Paul Sluimer.

(Continued)

*Primary Examiner* — Paul N Dickson
*Assistant Examiner* — Nicole Verley
(74) *Attorney, Agent, or Firm* — BCF LLP

(57) ABSTRACT

A leaning vehicle has a frame, a straddle seat, an engine, and a shock tower having a lower end pivotally connected to a front portion of the frame about a pivot axis. Front left and right suspension assemblies operatively connect to the front portion of the frame. A steering assembly has a steering column and a handlebar. A rear suspension is connected to the rear portion of the frame. Each front suspension assembly has a knuckle, a spindle passing through the knuckle and being rotatable relative to the knuckle about a steering axis, a lower suspension arm having an end pivotally connected to the frame and another end pivotally connected to the lower end of the spindle about a tilting axis parallel to the pivot axis, and a shock absorber having an upper end connected to the shock tower and a lower end connected to the lower suspension arm.

8 Claims, 12 Drawing Sheets

U.S. PATENT DOCUMENTS

| | | | |
|---|---|---|---|
| 6,071,032 A * | 6/2000 | Link | 403/158 |
| 6,170,838 B1 * | 1/2001 | Laurent et al. | 280/5.508 |
| 6,328,125 B1 | 12/2001 | Van Den Brink | |
| 6,435,522 B1 | 8/2002 | Van Den Brink | |
| 6,547,260 B2 * | 4/2003 | Laurent et al. | 280/5.509 |
| 6,859,702 B2 | 2/2005 | Kawashima et al. | |
| 6,863,288 B2 | 3/2005 | Van Den Brink | |
| 7,029,014 B2 * | 4/2006 | Hamm | 280/5.502 |
| 7,076,351 B2 * | 7/2006 | Hamilton et al. | 701/37 |
| 7,195,487 B2 | 3/2007 | Robbins | |
| 7,485,984 B2 | 2/2009 | Fulks et al. | |
| 7,487,985 B1 * | 2/2009 | Mighell | 280/124.103 |
| 7,494,141 B2 * | 2/2009 | Bouton | 280/124.103 |
| 7,530,419 B2 * | 5/2009 | Brudeli | 180/210 |
| 7,568,541 B2 * | 8/2009 | Pfeil et al. | 180/210 |
| 7,591,337 B2 * | 9/2009 | Suhre et al. | 180/210 |
| 7,648,148 B1 * | 1/2010 | Mercier | 280/124.103 |
| 7,762,368 B2 * | 7/2010 | Matthies | 180/210 |
| 7,967,306 B2 * | 6/2011 | Mighell | 280/124.103 |
| 8,070,172 B1 * | 12/2011 | Smith et al. | 280/124.103 |
| 2002/0190494 A1 * | 12/2002 | Cocco et al. | 280/124.135 |
| 2004/0051269 A1 * | 3/2004 | Bouton | 280/124.103 |
| 2005/0167174 A1 | 8/2005 | Marcacci | |
| 2005/0206101 A1 * | 9/2005 | Bouton | 280/6.154 |
| 2005/0275181 A1 * | 12/2005 | MacIsaac | 280/124.103 |
| 2006/0063137 A1 | 3/2006 | Robbins | |
| 2006/0097471 A1 | 5/2006 | Van Den Brink | |
| 2006/0151968 A1 * | 7/2006 | Kim | 280/86.757 |
| 2007/0029751 A1 | 2/2007 | Marcacci | |
| 2007/0262549 A1 * | 11/2007 | Haerr et al. | 280/124.103 |
| 2008/0197597 A1 * | 8/2008 | Moulene et al. | 280/124.103 |
| 2008/0238005 A1 | 10/2008 | James | |
| 2008/0258415 A1 * | 10/2008 | Melcher | 280/124.103 |
| 2009/0171530 A1 | 7/2009 | Bousfield | |
| 2010/0219598 A1 * | 9/2010 | Ziech | 280/93.512 |

FOREIGN PATENT DOCUMENTS

| | | |
|---|---|---|
| EP | 1798081 A1 | 6/2007 |
| JP | 11005557 A * | 1/1999 |
| WO | 2005075278 A1 | 8/2005 |
| WO | 2006130007 A2 | 12/2006 |
| WO | 2007041095 A2 | 4/2007 |

OTHER PUBLICATIONS

English Abstract of EP0251906; Published on Jan. 7, 1988.
International Search Report of PCT/US2010/041346, Sep. 24, 2010, Alain Gaillard.

* cited by examiner

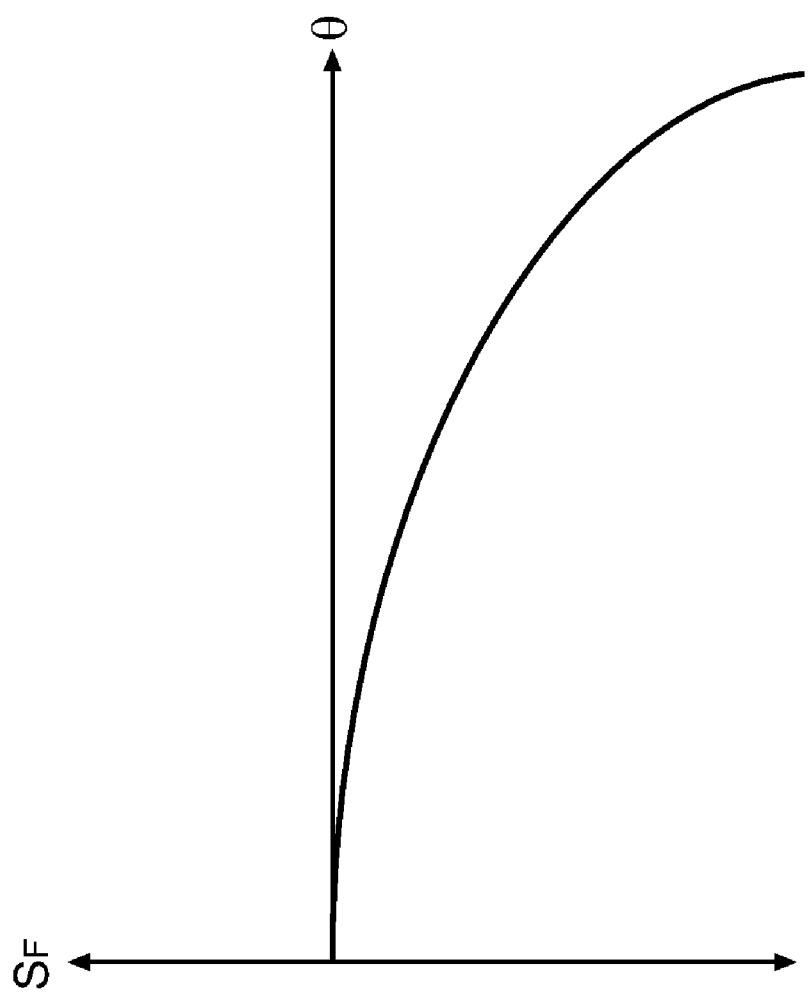

CONTROL SYSTEM FOR LEANING VEHICLE

CROSS-REFERENCE

The present application is a continuation of U.S. patent application Ser. No. 13/356,985, filed Jan. 24, 2012, which is a division of U.S. Pat. No. 8,123,240, issued Feb. 28, 2012, the entirety of both of which is incorporated herein by reference.

FIELD OF THE INVENTION

The present invention relates to a leaning vehicle.

BACKGROUND

Two-wheeled leaning vehicles such as bicycles and motorcycles are typically steered by the driver slightly shifting his upper body in the desired direction of the turn while pushing on the handle on the inside of the turn, causing what is known as "countersteering". The driver thus applies a torque to the handlebar in the direction opposite the intended direction of the turn. Attempting to turn the handlebar to the right, for example, initially turns the front wheel to the right, which causes the vehicle to initially turn gently to the right. This gentle turn to the right generates a roll moment on the vehicle to the left. The roll moment causes the motorcycle to lean to the left, which can be augmented by the driver leaning to the left, and as a result the vehicle executes a left turn. Some motorcycle drivers are taught to "push" on the handlebar in the direction of the desired turn, e.g. push on the left handle to turn left.

Some people are not aware of the fact that they countersteer while driving motorcycles. Countersteering is second nature to experienced motorcycle drivers, because they have countersteered leaning vehicles since their childhood bicycles, usually without realizing it even then. In addition, it is not intuitive to consciously think about turning the handlebar in one direction to turn the vehicle in the opposite direction. However, an experienced driver who is used to countersteering motorcycles may subconsciously countersteer any vehicle that feels like a motorcycle, and may find it confusing to drive steer-in-direction (i.e. non-countersteering) assisted-leaning three-wheeled vehicles with handlebars that typically steer like conventional cars.

Free-leaning three-wheeled vehicles may allow the driver to countersteer, but they generally have to overcome more resistance than two-wheeled vehicles when leaning. A motorcycle can be leaned merely by overcoming the gyroscopic effect of the wheels and tilting the vehicle to one side, whereas a three-wheeled vehicle must typically overcome a greater gyroscopic effect due to the three wheels, as may also have to pivot its frame relative to the suspension systems of the two laterally-spaced wheels. As a result, free-leaning three-wheeled vehicles may have a higher resistance to leaning, and as a result may be more difficult or less enjoyable to drive than motorcycles.

In addition, three-wheeled leaning vehicles may exhibit undesired leaning behaviours under certain conditions. For example, a free-leaning vehicle will tip over at rest unless it is supported by a stand. Some vehicles address this problem by providing a locking mechanism to prevent tipping over at rest, which the driver must either manually activate every time the vehicle has stopped or manually release when the vehicle starts moving. All of these conditions may diminish the enjoyment of the driver.

Therefore, there is a need for a leaning three-wheeled vehicle that remedies at least some of the above deficiencies.

SUMMARY

It is an object of the present invention to ameliorate at least some of the inconveniences present in the prior art.

In one aspect, the present provides a leaning vehicle having a frame having a front portion and a rear portion, a straddle seat mounted on the frame, an engine supported by the frame, a shock tower having an upper end and a lower end, the lower end of the shock tower being pivotally connected to the front portion of the frame, the frame being pivotable relative to the shock tower about a pivot axis between an upright position and a plurality of leaning positions, a front left suspension assembly and a front right suspension assembly operatively connected to the front portion of the frame, a steering assembly adapted to steer the vehicle, the steering assembly having a steering column supported by the frame and a handlebar connected to the steering column, and a rear suspension connected to the rear portion of the frame. Each front suspension assembly has a knuckle, a spindle passing through the knuckle, an upper end of the spindle protruding from the knuckle, a lower end of the spindle protruding from the knuckle, the knuckle being rotatable relative to the spindle about a steering axis, a lower suspension arm having a first end pivotally connected to the frame and a second end pivotally connected to the lower end of the spindle about a tilting axis, the tilting axis being parallel to the pivot axis, and a shock absorber having an upper end connected to the shock tower and a lower end connected to the lower suspension arm.

In a further aspect, each knuckle comprises a rearwardly extending steering arm. The steering arm is operatively connected to the steering column.

In an additional aspect, each front suspension also has a leaning rod having a first end connected to the upper end of the spindle and a second end connected to the frame. For each front suspension, pivoting of the frame relative to the shock tower about the pivot axis pivots the spindle in a same direction about the tilting axis.

In a further aspect, a first steering rod has a proximal end operatively connected to the steering column and a distal end connected by a first ball joint to the knuckle of the front right suspension assembly. The first ball joint permits simultaneous rotation of the knuckle of the front right suspension assembly about the steering axis and the tilting axis of the front right suspension assembly. A second steering rod has a proximal end operatively connected to the steering column and a distal end connected by a second ball joint to the knuckle of the front left suspension assembly. The second ball joint permits simultaneous rotation of the knuckle of the front left suspension assembly about the steering axis and the tilting axis of the front left suspension assembly.

In an additional aspect, a brake caliper is fixed to each knuckle.

In a further aspect, a right hub is connected to the knuckle of the front right suspension assembly. A front right wheel is connected to the right hub. The front right wheel is rotatable relative to the knuckle of the front right suspension assembly about a right rotation axis. A left hub is connected to the knuckle of the front left suspension assembly. A front left wheel is connected to the left hub. The front left wheel is rotatable relative to the knuckle of the front left suspension assembly about a left rotation axis.

In an additional aspect, a first bearing rotatably connects the knuckle of the front right suspension assembly to the spindle of the front right suspension assembly about the steering axis of the front right suspension assembly. The first bearing is disposed above the right rotation axis. A second bearing rotatably connects the knuckle of the front right suspension assembly to the spindle of the front right suspension assembly about the steering axis of the front right suspension assembly. The second bearing is disposed below the right rotation axis. A third bearing rotatably connects the knuckle of the front left suspension assembly to the spindle of the front left suspension assembly about the steering axis of the front left suspension assembly. The third bearing is disposed above the left rotation axis. A fourth bearing rotatably connects the knuckle of the front left suspension assembly to the spindle of the front left suspension assembly about the steering axis of the front left suspension assembly. The fourth bearing is disposed below the left rotation axis.

In a further aspect, a right disk brake has an outer periphery connected to the front right wheel. The right disk brake is rotatable with the front right wheel about the right rotation axis. A right brake caliper is disposed at least in part radially inwardly of an inner diameter of the right disk brake. The right brake caliper is adapted to apply a braking force to the right disk brake. A left disk brake has an outer periphery connected to the front left wheel. The left disk brake is rotatable with the front left wheel about the left rotation axis. A left brake caliper is disposed at least in part radially inwardly of an inner diameter of the left disk brake. The left brake caliper is adapted to apply a braking force to the left disk brake.

For purposes of this application, angle measures and angular quantities such as torque are considered to be positive in a clockwise (right-turning) direction and negative in a counter-clockwise (left-turning) direction. For example, to turn the vehicle to the left, the driver initiates the turn by exerting a positive (countersteering) torque to turn the handlebar to the right, i.e. clockwise about the steering column axis. As a result, the frame of the vehicle experiences a negative torque to the left, resulting in a negative lean angle to the left, i.e. counterclockwise as seen by the driver, and as a result the vehicle executes a left turn, i.e. counterclockwise as seen from above.

Embodiments of the present invention each have at least one of the above-mentioned object and/or aspects, but do not necessarily have all of them. It should be understood that some aspects of the present invention that have resulted from attempting to attain the above-mentioned object may not satisfy this objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIGS. 10A-10E are graphical representations of control maps for the control unit of FIG. 9 according to different embodiments of the invention.

DETAILED DESCRIPTION

Figure 1:
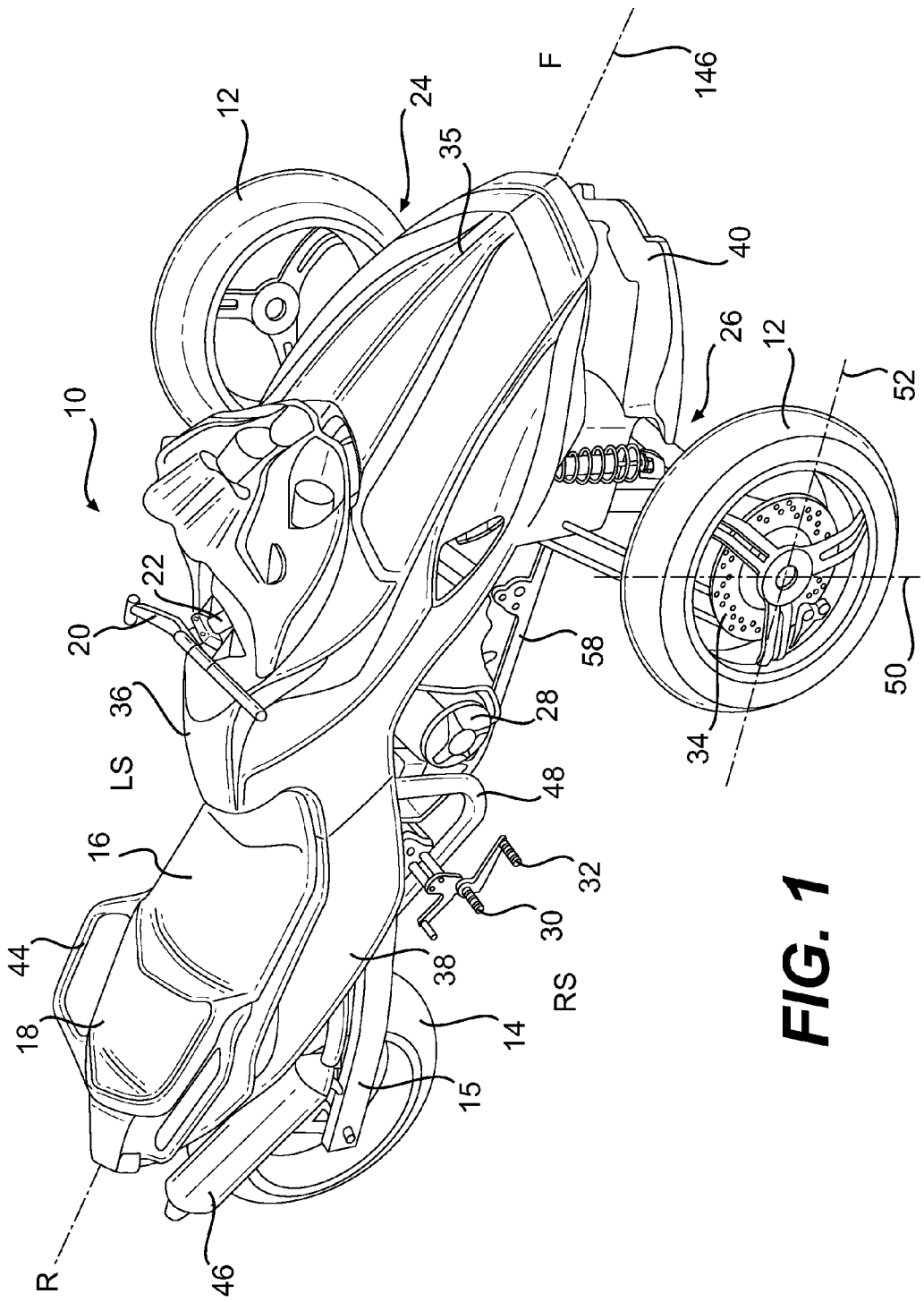
FIG. 1 is a front, right perspective view of a three-wheel leaning vehicle including a front suspension in accordance with an embodiment of the invention.

FIG. 1 illustrates a three-wheel leaning vehicle 10 in accordance with an embodiment of the invention. The particular aesthetic design details of the three-wheel vehicle 10 are not critical to this invention, and FIG. 1 merely illustrates one possible configuration. The three-wheel leaning vehicle 10 has a left side LS, a right side RS, a front F, and a rear R as viewed by a driver driving the vehicle. The vehicle 10 includes a frame 58 that supports and houses an engine 28, which could be any suitable type of power source such as an internal combustion engine or an electric motor. A straddle-type seat 16 is mounted on the frame 58 and preferably has a driver seat portion and a passenger seat portion 18 disposed behind the driver seat portion. The leaning vehicle 10 features two front wheels 12; one on the left side and one on the right side of a longitudinal axis 146, and a single central rear wheel 14. The central rear wheel 14 is suspended by a rear suspension system 15 attached to the rear portion of the frame 58 and is operatively connected to the engine 28 through a suitable power transmission mechanism such as a gearbox or a continuously-variable transmission coupled to an endless belt, chain, or driveshaft assembly. A steering mechanism such as a handlebar 20 in front of the seat 16 is connected to the front wheels 12 via a steering column 22 to steer the vehicle 10. Left and right suspension assemblies 24, 26 attach the front wheels 12 to the vehicle 10 to permit the steering of each wheel 12 about a substantially vertical steering/king pin axis 50 and tilting of each wheel 12 about wheel tilting axis 52.

A pair of foot pegs 30 (only one of which is shown) project from vehicle 10 so that the driver may rest his/her feet thereupon while driving. A brake pedal 32 is situated in front of the right foot peg 30 to apply the front brakes 34 and rear brake (not shown). The vehicle 10 also includes a plurality of fairings 35, 36, 38, and 40 which serve to protect the vehicle components from the elements during use and render the vehicle aerodynamically efficient and aesthetically pleasing. A windshield (not shown) may be placed in front of the handlebar 20 to protect the driver from oncoming wind. Left and right passenger handles 44 are attached to each side of the passenger seat portion 18. A muffler 46, in fluid communication with the engine 28 via pipe 48, is attached to the rear R of the vehicle 10. It is contemplated that any suitable alternative configuration of the pipe 48 may be used.

In operation, the left and right suspension assemblies 24 and 26 are connected to the frame 58 of the vehicle 10, as described herein below, to permit the frame 58 and therefore the driver and the single central rear wheel 14 to lean towards the right side or the left side much like a motorcycle. Additionally, the front wheels 12 are connected to the left and right suspension assemblies 24 and 26 in such a way that the front wheels 12 also tilt when the frame 58 is leaning into a corner thereby duplicating a motorcycle behavior and driving style with the three-wheel vehicle 10.

With reference to FIGS. 2-8, the suspension assemblies 24, 26 will be described in detail. The suspension assemblies 24, 26 are mirror images of each other and function in substantially the same manner, and as such some components will be shown and/or described with respect to only one or the other of the suspension assemblies 24, 26.

Figure 2:
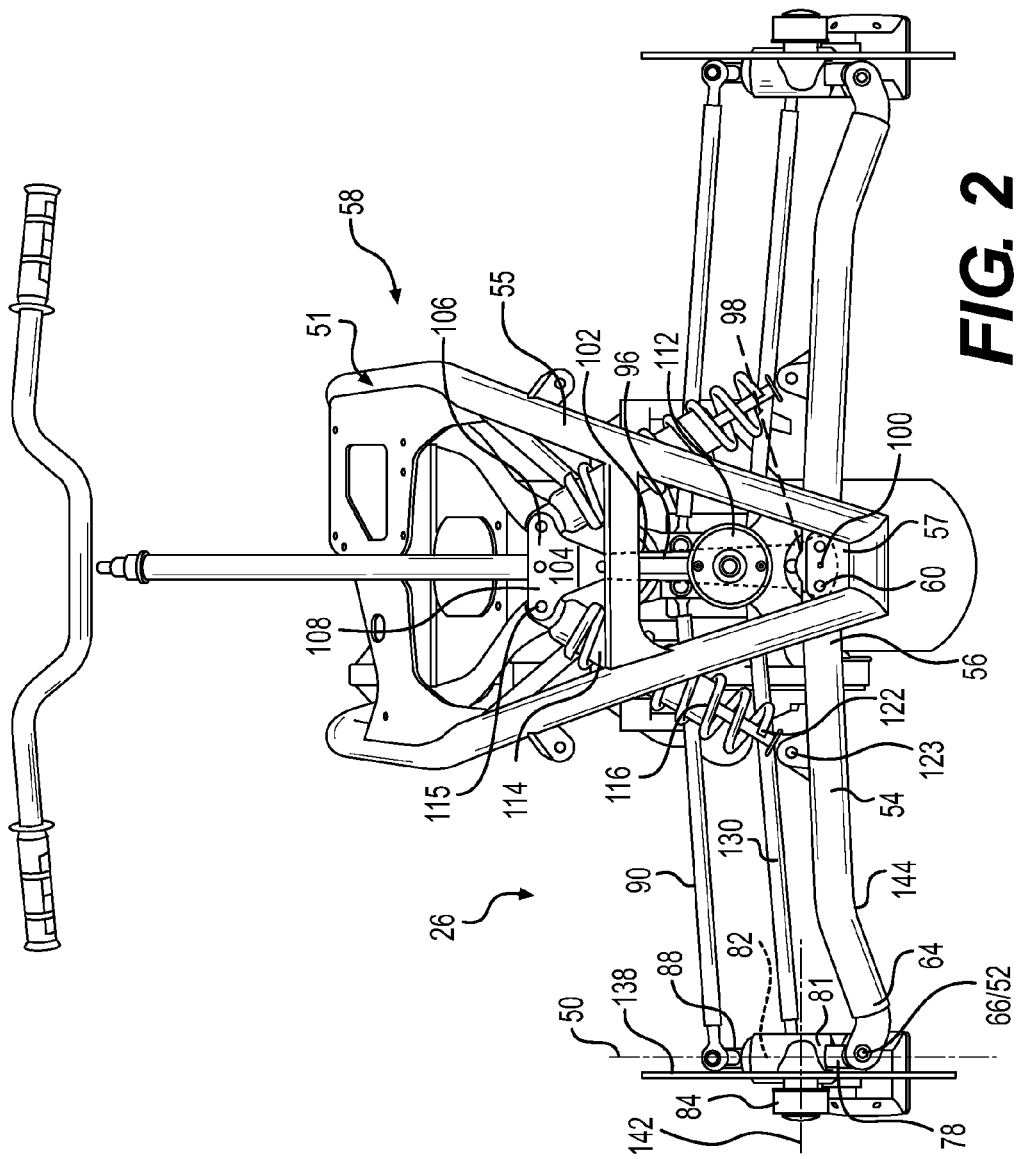
FIG. 2 is a front elevation view of the front suspension of the three-wheel vehicle shown in FIG. 1 including a portion of the vehicle frame.
Figure 3:
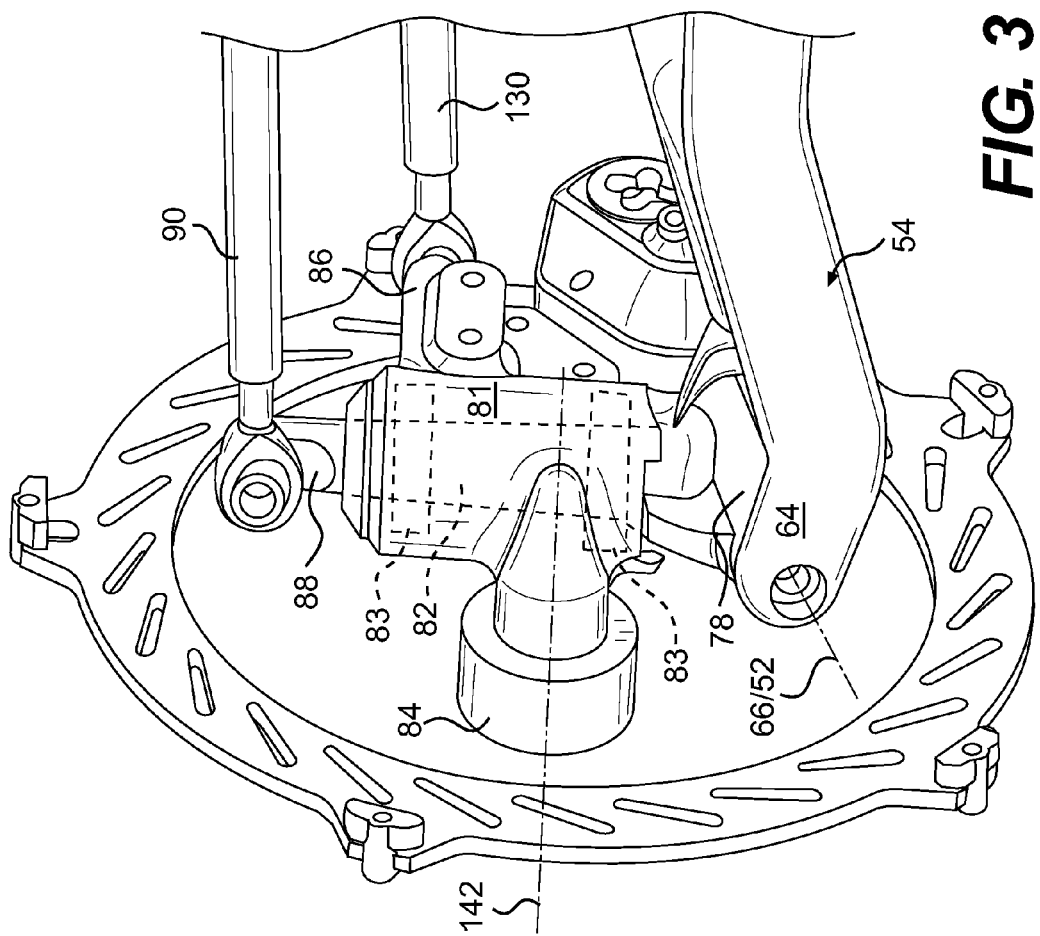
FIG. 3 is a front, left perspective view of a brake and a spindle of the three-wheel shown in FIG. 1, to which the front suspension system is attached.

With reference to FIGS. 2 and 3, the front suspension assembly 26 includes a lower suspension arm 54 pivotally attached at a first end 56 to a bracket 57 rigidly attached to a lower portion of the frame 58, defining a first pivot point 60. The lower suspension arm 54 is also pivotally attached at a second end 64 to a lower portion 78 of a spindle 82, defining a second pivot point 66 as well as the wheel tilting axis 52. The spindle 82 passes through a knuckle 81 and aligns with the steering/king pin axis 50 such that the knuckle 81 may rotate relative to the spindle 82 to steer the wheel 12 about steering/king pin axis 50. Bearings 83 (FIG. 3) provide smooth rotation between the spindle 82 and the knuckle 81. A hub or bearing 84 is used to attach the front wheel 12 to the front suspension assembly 26 such that the front wheel 12 rotates about rotation axis 142. The knuckle 81 also includes a steering arm 86. A leaning rod 90 connects the top portion 88 of the spindle 82 to the frame 58. A steering rod 130 connects the steering arm 86 of knuckle 81 to a steering mechanism 126 (as best seen in FIGS. 5 and 6).

Figure 4:
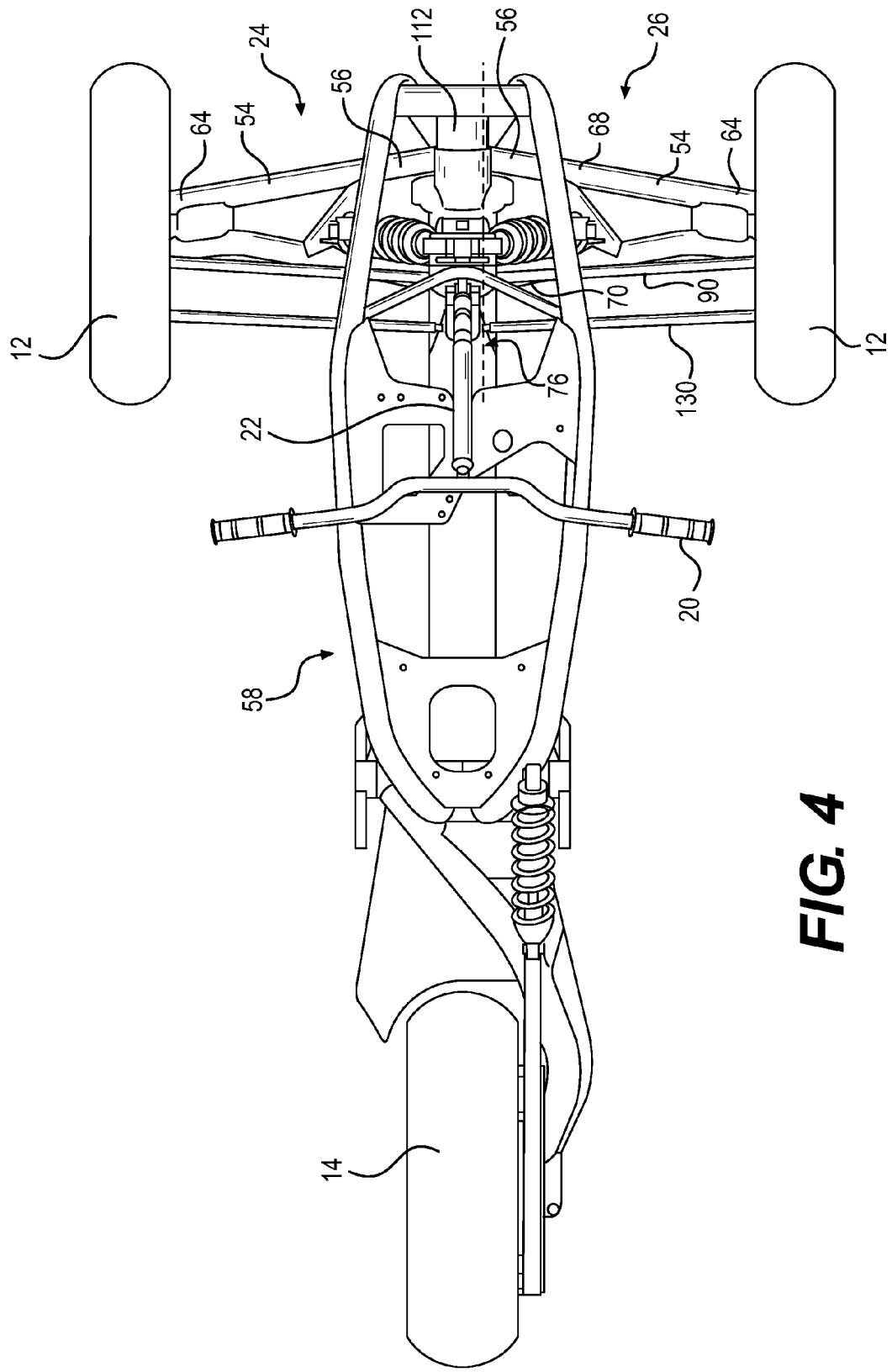
FIG. 4 is a top plan view of the front suspension and frame of the three-wheel vehicle of FIG. 1.

With reference to FIG. 4, the lower suspension arm 54 includes a front portion 68 and a rear portion 70 to form a 'Y' or 'V' shape. The lower suspension arm 54 is attached to the frame 58 at a front location 72 (FIG. 2) and a rear location 74 (FIG. 5) which together define the pivoting axis 76 of the lower suspension arm 54. The pivoting axis 76 passes through pivot point 60. The lower suspension arm 54 also includes an upwardly curved portion 144, best seen in FIG. 2, between first and second ends 56 and 64. The upwardly curved portion 144 allows for clearance between the wheel 12 and the suspension arm 54 when the vehicle 10 is leaning during a turn. It is to be understood that the upwardly curved portion 144 lies above a plane including the pivoting axis 76 and the wheel tilting axis 52.

Figure 5:
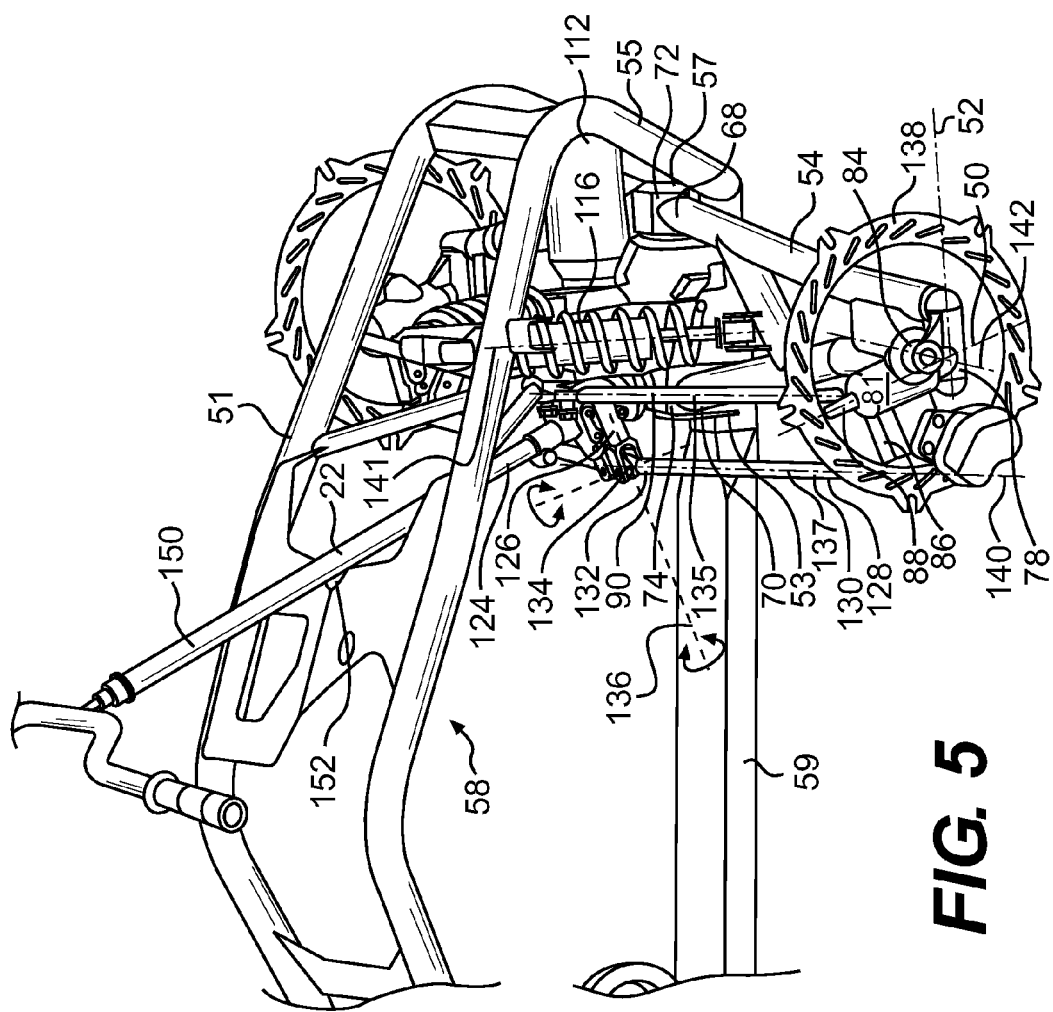
FIG. 5 is a top, right perspective view of the front suspension and frame of the three-wheel vehicle of FIG. 1.
Figure 6:
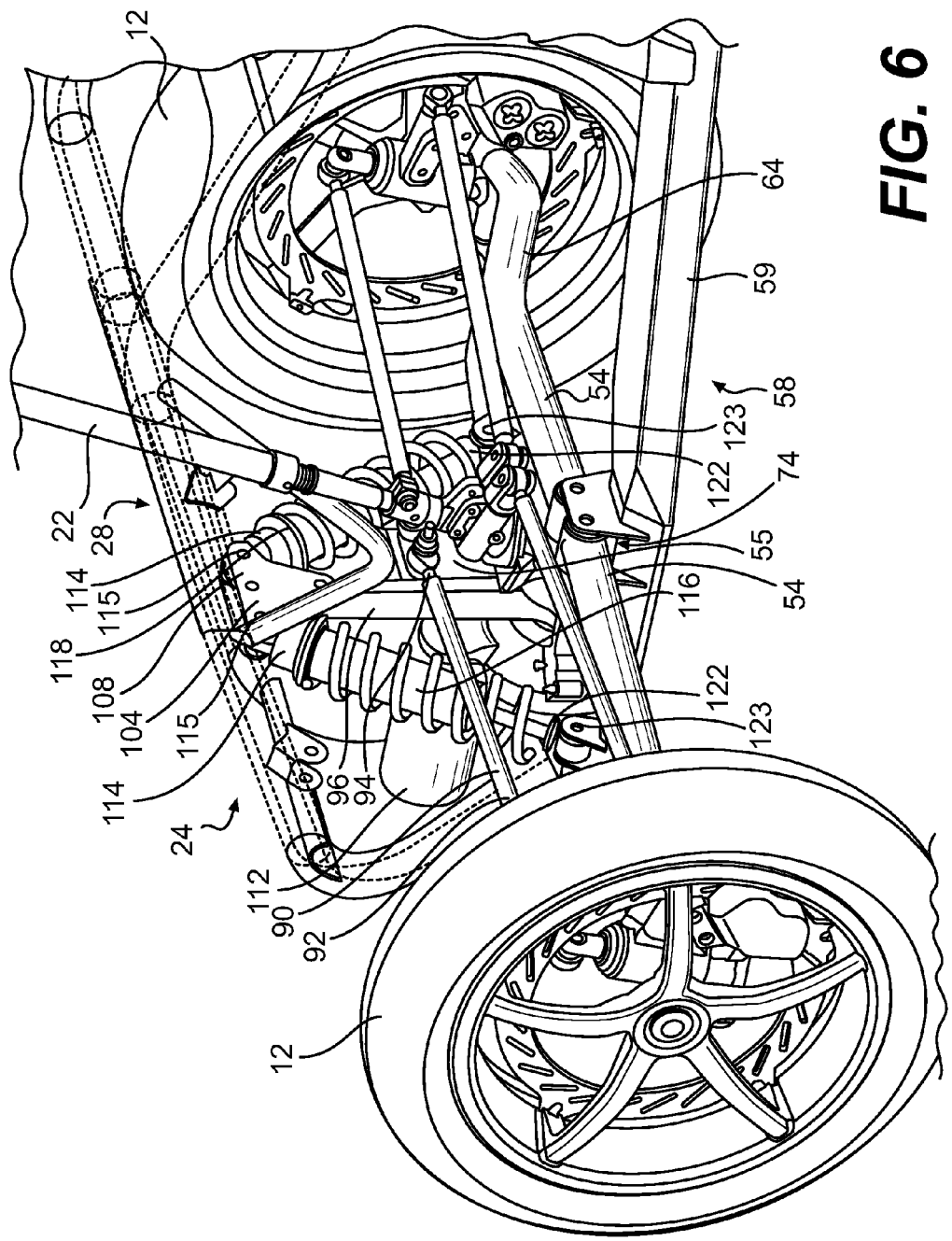
FIG. 6 is a rear left perspective view of the front suspension and frame of the three-wheel vehicle of FIG. 1.

With reference to FIG. 5, the frame 58 includes a lower member 59, an upright member 55 and an upper member 51. The lower member 59 is curved upwardly at the rear (not shown) to connect with the upper member 51. The upright member 55 joins the front of the upper member 51 to the front of the lower member 59 to form a rigid frame 58. Brackets 57 and 53 are connected to the lower member 59 at forward location 72 and rear location 74 respectively to which the front and rear portions 68 and 70 of the lower suspension arm 54 are connected. An upper end 150 of the steering column 22 passes through an aperture 152 in the upper member 51 of the frame 58 and is supported by a bearing (not shown) mounted to the upper member 51 or by other components of the vehicle 10. The steering column 22 is connected to a steering linkage 126 which in turn is connected to a proximal end 128 of the steering rod 130. A distal end 132 of the steering rod 130 is connected to the steering arm 86 of the knuckle 81. Preferably, the proximal end 128 and the distal end 132 of the steering rod 130 are connected to the steering linkage 126 and steering arm 86 via ball joints 134 to allow the spindle 82 to simultaneously lean and steer. The steering rod 130 and the ball joint 134 are pivotally connected to the steering linkage 126 via a pivot connection which allows rotation about the axis 136. The combination of the ball joint 134 and the pivot connection about the axis 136 allows for large leaning angles and large steering angles without binding of the steering components.

FIG. 5 illustrates the steering/king pin axis 50 which is defined by the rotation of the spindle 82 relative to the knuckle 81 to steer the vehicle 10. FIG. 5 also illustrates the wheel tilting axis 52 defined by the connection of the lower portion 78 with the end 64 of the lower suspension arm 54 about which the wheel 12 may tilt towards the frame 58 or away from the frame 58.

Referring now to FIG. 6, a first end 92 of the leaning rod 90 is connected to the top portion 88 of spindle 82 (FIG. 2) and a second end 94 of the leaning rod 90 is connected to the upright member 55 of the frame 58. The upright member 55 of the frame 58 is therefore directly connected to the top portion 88 of the spindle 82 to push or pull the spindle 82, via the leaning rod 90, to pivot about the wheel tilting axis 52 when the frame 58 is leaning. The wheel 12 is therefore tilted when the frame 58 is leaning to one side or the other. Preferably, ball joints are used to connect the leaning rod 90 to the top portion 88 of the spindle 82 and the frame 58 so that the leaning rod 90 may only be subjected to tension and compression forces when pushing or pulling the spindle 82. The leaning rod 90 provides a rigid link to maintain alignment between the leaning angle of the frame 58 and the wheel camber, and as a result the gyroscopic stability of the wheel camber provides stability to the orientation of the frame 58 at high speeds.

Figure 7:
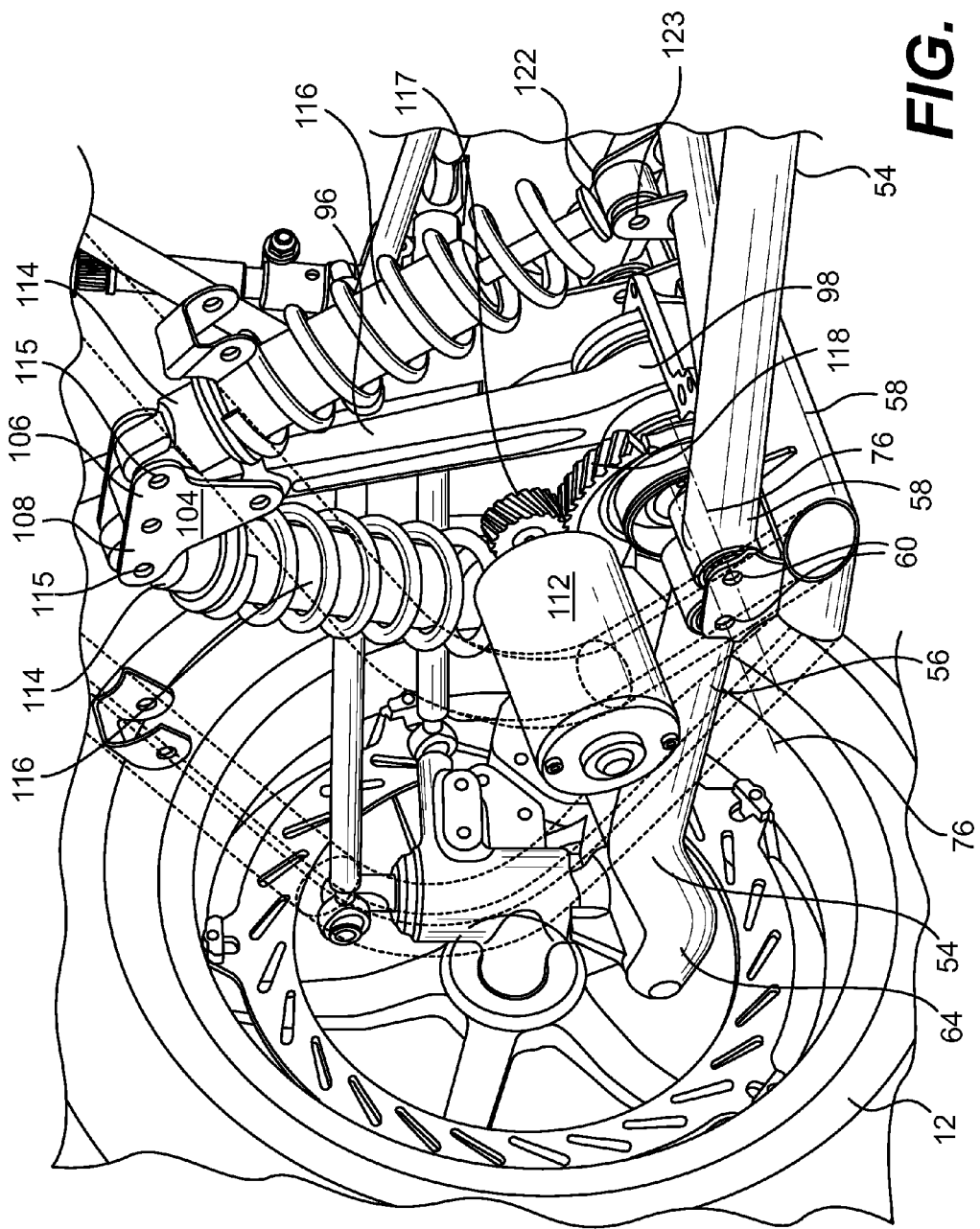
FIG. 7 is a partially cut-away front left perspective view of the front suspension and frame of FIG. 5.

With reference to FIGS. 2, 6 and 7, a pivotable frame member in the form of a shock tower 96 is pivotally attached at a lower end 98 to the frame 58, such that the frame 58 pivots with respect to the shock tower 96 about frame pivot axis 100. The frame 58 and the shock tower 96 may therefore pivot relative to one another about the pivot axis 100. The upper end 102 of the shock tower 96 includes a bracket 104 having a left side 106 and a right side 108. It is contemplated that the bracket 104 may be formed integrally with the shock tower 96 in a one-piece construction. An electric actuator 112 is mounted on a forward portion of the frame 58, and selectively exerts a torque on the shock tower 96 via an output gear 117 and a gear 118. The gear 118 is fixed to the shock tower 96 and is concentric with the frame pivot axis 100. It is contemplated that the actuator 112 may be oriented vertically instead of horizontally, in which case the gears 117, 118 would be replaced by bevel gears or any other suitable gearing arrangement. It is further contemplated that any other suitable actuator may alternatively be used, such as a mechanical or hydraulic actuator. It is further contemplated that more than one actuator 112 may be provided. An upper end 114 of a shock absorber assembly 116 is attached to an extremity of the right side 108 of the bracket 104 at a pivot point 115 while the lower end 122 of the shock absorber assembly 116 is attached to the lower suspension arm 54 at pivot point 123. A second shock absorber and actuator are connected to the shock tower 96 and frame 58 on the left side of the shock tower 96, symmetrical about the frame pivot axis 100.

Referring back to FIG. 5, a brake disk 138 is fixed to rotate about the axis 142. A brake caliper 140 is fixed to be stationary with the knuckle 81. When the caliper 140 applies a braking force to the disc brake 138 to reduce the rotational speed of the hub/bearing 84 and thus the wheel 12, the spindle 82 is subjected to a torque in the direction of the arrow T (for a forward travelling direction of the vehicle). Because of the orientation of the axis 50, 52 and because the spindle 82 cannot rotate in the direction of the torque T relative to the lower suspension arm 54, all of the torque T is transferred to the lower suspension arm 54.

Having all the braking forces pass through the lower suspension arm 54 permits the leaning rod 90 to have a small diameter and occupy very little longitudinal space when compared to an upper A-arm of a conventional double A-arm suspension designed to withstand braking forces such as lower suspension arm 54. This leaves ample space for the wheel to tilt inwards without contacting other components, particularly when simultaneously steering the wheel through large steering angles. This design also allows for the necessary space to easily mount the shock absorber 116 to the shock tower 96.

Prior art designs having two A-arms, one situated above the other, allow the arms to be smaller since the torsion forces are distributed between the upper and lower A-arms. However this configuration can limit the degree of leaning of the wheel. The single lower suspension arm 54 of the present invention is bulkier than typical double A-arms systems but allows the leaning rod 90 to be a small single rod thereby freeing space and allowing the wheels to lean farther than double A-arms systems.

The present configuration allows for sufficient space for all the front suspension components to articulate, lean, tilt and turn without interfering with one another or with the actuator 112. As illustrated in FIG. 5, the shock absorber 116 lies in a substantially vertical plane 141 substantially perpendicular to the frame pivot axis 100. Leaning rod 90 and steering rod 130 also lie within substantially vertical planes 135, 137 which are also substantially parallel to the plane 141 in which the shock absorber 116 lies.

It should be understood that while the frame 58 is leaning to the left or right, the wheels 12 are also leaning to the left or right and could also be simultaneously steered. The leaning of the frame 58 and the wheels 12 lowers the steering and leaning rods 130, 90 toward the lower suspension arm 54. Keeping the components in their respective substantially vertical planes throughout the leaning process ensures no interference between each component. Although simultaneously steering the wheel 12 about axis 50 while leaning the wheel 12 about axis 52 will cause some longitudinal movement of the steering and leaning rods 130, 90, the longitudinal distance between the components combined with the components remaining in substantially vertical planes ensures that there is no interference between the components.

Figure 8:
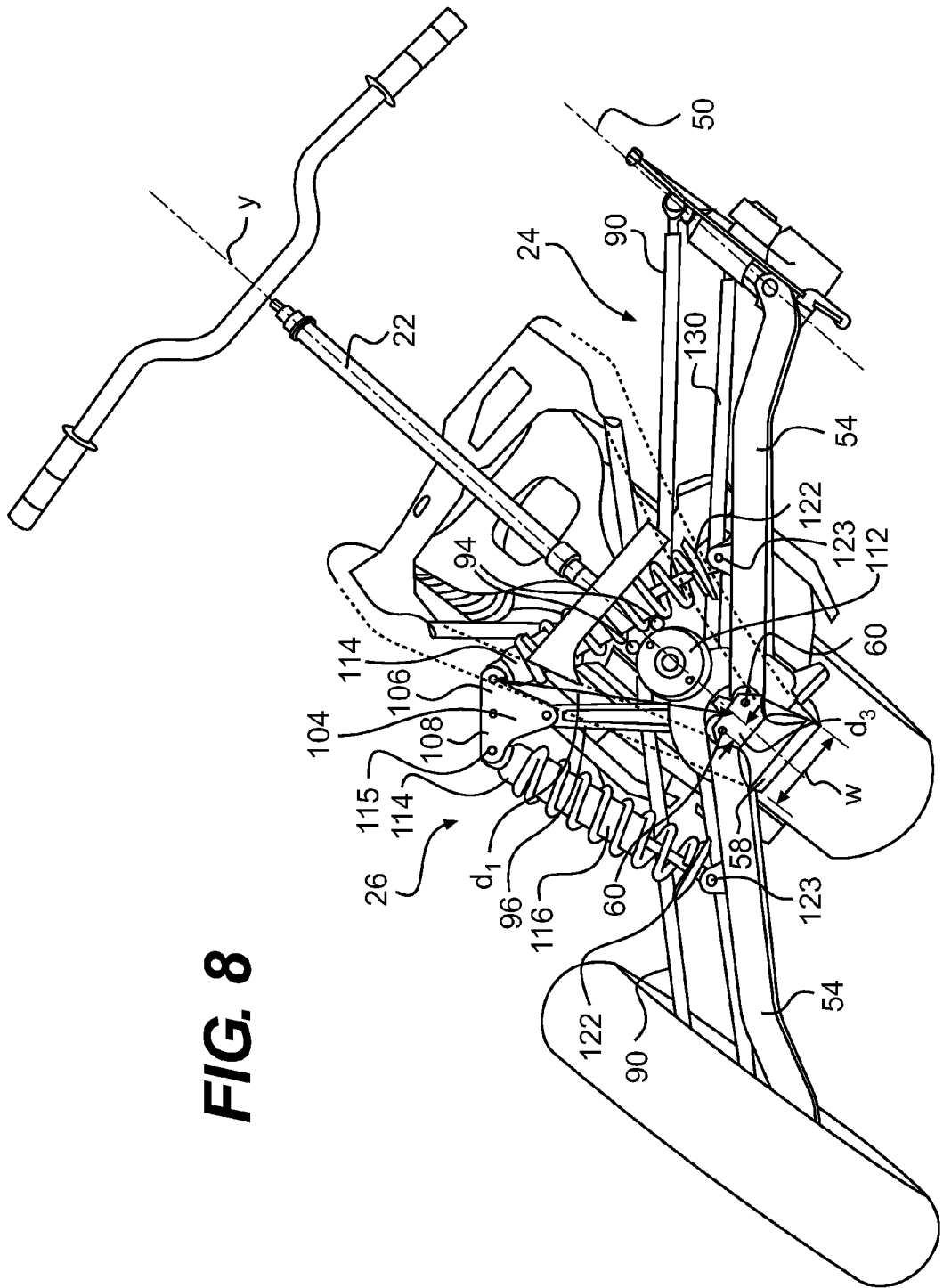
FIG. 8 is a front elevation view of the front suspension and frame of FIG. 5, with the vehicle leaning to the left.

With reference to FIG. 8, in operation, the vehicle 10 is countersteered similarly to a two-wheeled motorcycle in order to turn. Taking the example of a left turn, the driver exerts a torque on the handlebar 20 in the clockwise direction as seen from above, which rotates the knuckle 82 clockwise about the axis 50. The gyroscopic forces acting on the wheel 12 exert a counterclockwise torque (as seen from the rear) about the axis 52. This torque is transmitted to the frame via the knuckle 82 and the leaning rod 90, causing the frame 58 to pivot counterclockwise with respect to the shock tower 96 about the frame pivot axis 100, with the result that the vehicle turns to the left. In the embodiment shown, the steering axis 50 of the inside wheel 12 remains substantially parallel to the frame 58 during a turn, whereas the steering axis 50 of the outside wheel 12 acquires a slight negative camber (not shown), however it should be understood that the respective steering axes 50 may tilt by different angles or in different directions depending on the particular geometry of the vehicle 10.

As can be seen in FIG. 8, when the vehicle 10 is leaning into a turn, the shock tower 96 remains substantially upright while the frame 58 pivots with respect to the shock tower 96 about the frame pivot axis 100 such that the shock absorber assembly 116 of the front suspension is not directly involved in the leaning motion of the frame 58. The operation of the shock absorber assembly 116 is independent of the leaning motion of the frame 58. The motion ratio between wheels 12 and the shock absorber assemblies 116 remains substantially constant while the frame 58 is leaning to provide generally unaltered wheel dampening while leaning into a turn and travelling over rough terrain at the same time. The motion ratio is the ratio between the vertical movement of the wheel 12 and the stroke of the corresponding shock absorber 116. A person skilled in the art would recognise that a substantial change in motion ratio due to the leaning of the frame 58 is not desirable. As can be seen in FIG. 8, the top pivot point 115 of shock absorber assembly 116 remains at a constant distance d1 from the frame pivot axis 100 when the frame 58 is leaning. However, the bottom pivot point 123 of shock absorber 116 (which is located on the lower suspension arm 54), follows the marginal displacement of lower suspension arm 54 downward and inward caused by the rotational displacement of its first pivot point 60 about the frame pivot axis 100 when the frame 58 is leaning to the right. The distance d3 defines the radius of the rotational displacement of the pivot point 60 about the frame pivot axis 100 when the frame 58 is leaning. By keeping d3 within a certain range, the change in motion ratio is minimal. It is to be understood that by decreasing distance d3, the motion ratio becomes less affected by the leaning of the frame 58. A fully constant motion ratio can be obtained by having lower suspension arm axis 76 (pivot point 60) coaxial with the frame pivot axis 100.

Figure 9:
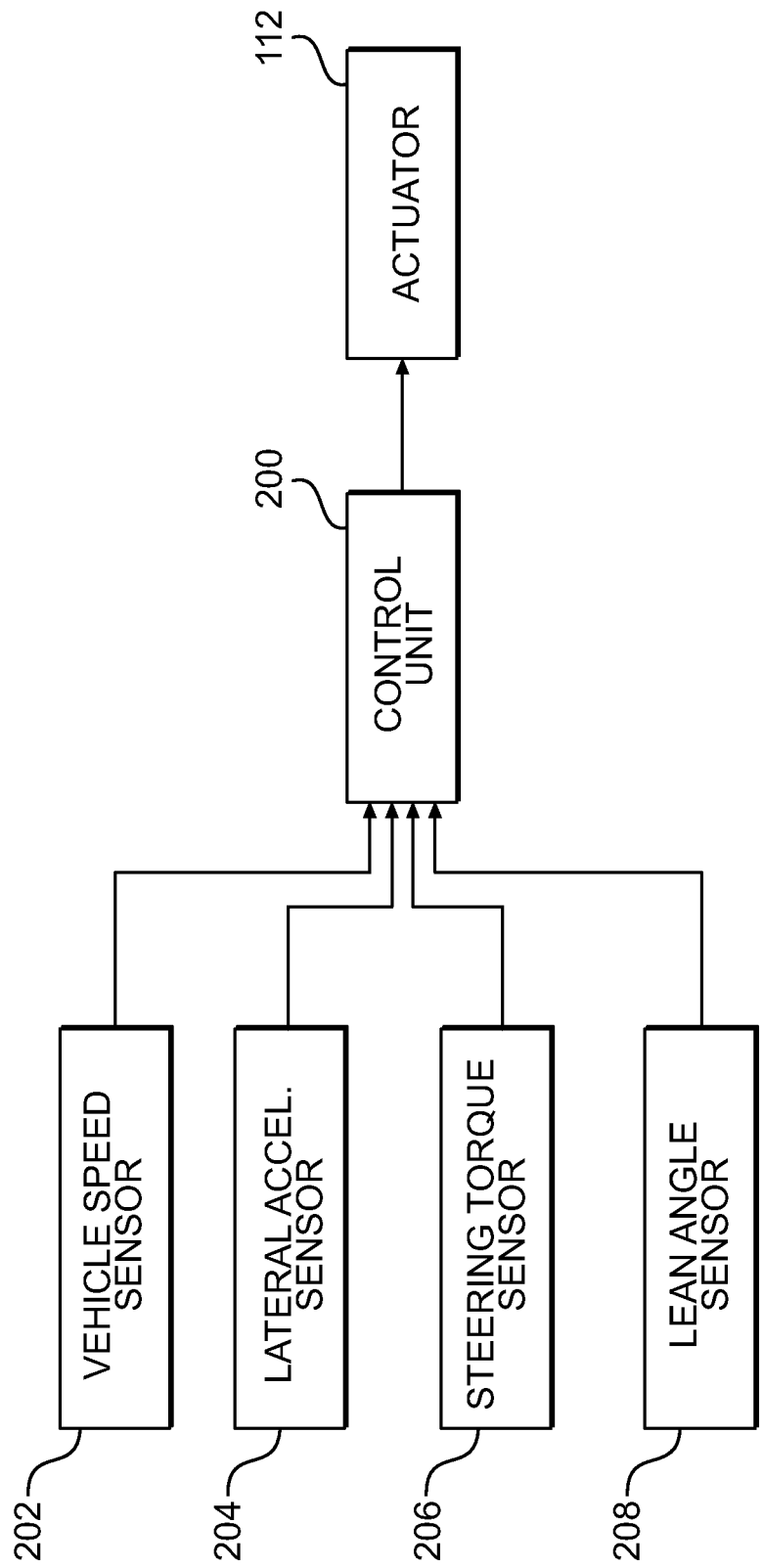
FIG. 9 is a block diagram of a control unit for controlling an operation of the vehicle and the components connected thereto according to an embodiment of the invention.

With reference to FIG. 9, a control unit 200 for controlling the actuator 112 and the components connected thereto will be described. The control unit 200 is electrically connected to a number of sensors, including a vehicle speed sensor 202 for detecting a speed of travel of the vehicle 10, a lateral acceleration sensor 204 for detecting a lateral acceleration of the vehicle 10, a steering torque sensor 206 for detecting a torque exerted on the steering mechanism, and at least one lean angle sensor 208 for detecting an angle of the frame 58 with respect to a reference angle. The reference angle may be any suitable angle, such as a vertical orientation determined by gravity, the angle of the road surface, or the orientation of the shock tower 96. It is contemplated that different reference angles may be used at different vehicle speeds. For example, the reference angle may be a vertical orientation at low speeds and the orientation of the shock tower 96 at high speeds. The control unit 200 receives signals from the sensors 202, 204, 206, 208 regarding the operating state of the vehicle 10. It is contemplated that some of these sensors may be omitted, or replaced with other sensors that provide similar information to the control unit 200. It is further contemplated that additional sensors of different types may be electrically connected to the control unit 200. The control unit 200 is electrically connected to the actuator 112, and controls the operation of the actuator 112 based on the signals received from the sensors.

With reference to FIGS. 10A-10D, the operation of the actuator 112 will be described according to a number of alternative embodiments. The control unit 200 selectively causes the actuator 112 to exert a torque between the frame 58 and the shock tower 96 about the frame pivot axis 100. The magnitude, direction, and duration of the torque generated by the actuator 112 is determined by the control unit 200 based on the inputs received from one or more of the sensors and one or more stored control maps. In the present embodiment, the torque depends on the speed of the vehicle 10 as indicated by the speed sensor 202, the torque exerted on the steering column 22 as indicated by the steering torque sensor 206, and the current lean angle as indicated by the lean angle sensor 208. The torque T generated by the actuator 112 is calculated as $$T = K_\theta \cdot \theta + K_s \cdot S$$

where θ is the current lean angle with respect to the reference angle, S is the difference between the current steering torque $S_T$ on the steering assembly and the steering torque $S_F$ required to maintain the frame at the desired lean angle, and $K_\theta$ and $K_s$ are quantities determined from the control map based on the signals received by the control unit 200. It is contemplated that the term θ may be the current lean angle with respect to any suitable reference angle such as those described herein. It is further contemplated that the term $K_\theta \cdot \theta$ may alternatively be replaced by any suitable function of θ that produces the desired performance characteristics. It is further contemplated that the term $K_\theta \cdot \theta$ may alternatively be replaced by a multivariate function of the current lean angles with respect to two or more suitable reference angles, for example a first component based on the lean angle with respect to the shock tower 96 and a second component based on the lean angle with respect to vertical. The particular dependency on the lean angle θ may take any suitable form, provided the resulting torque exerted on the frame 58 is a restoring torque urging the frame 58 toward the reference angle. S is calculated as $$S = S_T - S_F$$

where $S_F$ is a function of the desired lean angle as shown in FIG. 10E. The desired lean angle is determined based on a number of parameters including vehicle speed, steering torque, and lateral acceleration. It should be understood that the effect of the $K_s \cdot S$ term is to generate a torque T on the frame until the terms $S_T$ and $S_F$ are equal in magnitude, which occurs when the lean angle θ corresponds to the steering torque $S_T$.

Figure 10B:
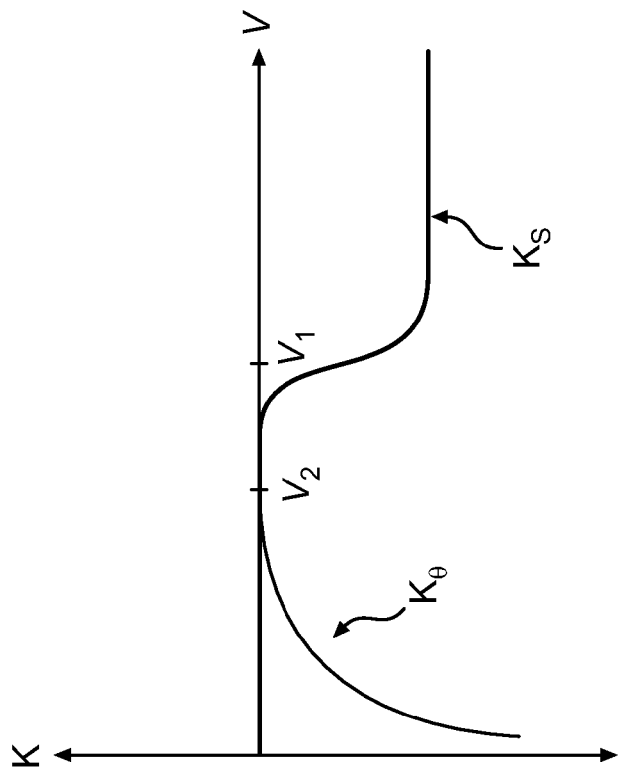
Figure 10A:
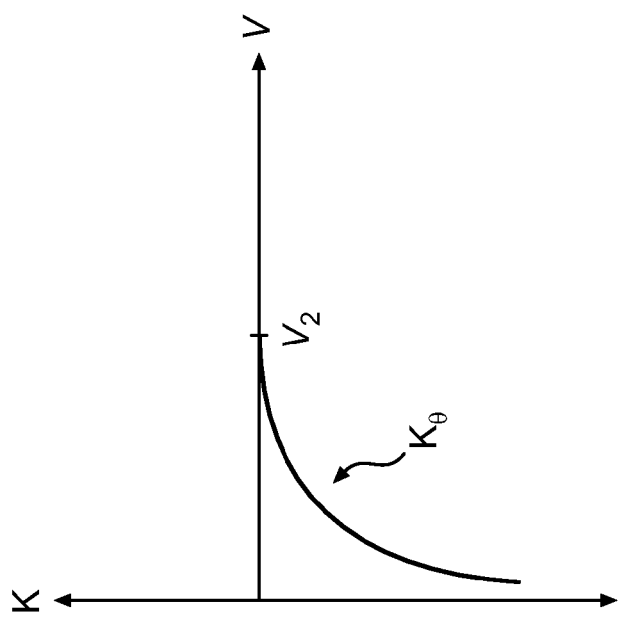

Referring to FIG. 10A, according to a first embodiment $K_\theta$ is zero when the vehicle is travelling at a high speed, begins to increase in magnitude when the vehicle speed is below a threshold speed $v_2$, and becomes larger in magnitude as the vehicle speed approaches zero. The sign of $K_\theta$ is always negative, indicating that the torque T resulting from the lean angle is a restoring force in the direction opposite the lean angle θ. The torque T opposes the frame 58 leaning with respect to the reference angle, resulting in a "stiffness" or lean resistance that increases in magnitude as the vehicle slows, effectively limiting the lean angle to smaller values at slower speeds. When the vehicle is stopped, the actuator 112 may optionally lock the frame 58 in a vertical position with respect to the reference angle. As a result, large leaning angles are prevented at low speeds, when excessive leaning could cause discomfort or inconvenience to the rider. In particular, when the vehicle 10 is stopped, the frame 58 is maintained in an upright position so that the driver may maintain his seating position with his feet on the foot pegs 30 instead of having to place one or both feet on the ground to maintain the vehicle 10 upright as is commonly required on a two-wheeled motorcycle. In addition, if the driver is attempting to park the vehicle 10 at low speeds he may exert significant torque on the handlebar 20 to steer the vehicle 10, but may not desire the vehicle 10 to lean significantly. In this embodiment, $K_s$ is zero, such that the torque T only has a lean angle component, and the vehicle 10 is effectively free-leaning above the threshold speed $v_2$, with no leaning torque being generated by the actuator 112. The vehicle 10 steers in a manner similar to a motorcycle, by countersteering and leaning the frame 58 into the turn, with the leaning torque being generated by the driver's countersteering and the geometry of the vehicle 10, independently of the actuator 112.

Referring to FIG. 10B, according to a second embodiment $K_\theta$ is similar to the embodiment of FIG. 10A, and provides a restoring torque to limit or prevent leaning at low speeds. In this embodiment, $K_s$ is zero at low speeds, such that the leaning behaviour of the vehicle 10 at low speeds is similar to the embodiment of FIG. 10A. At higher speeds, $K_s$ gradually increases in magnitude until it reaches an approximately constant value above a second threshold speed $v_1$. In this embodiment, when the speed is above $v_1$ and the driver exerts a steering torque s on the handlebar 20 indicative of his desire to turn the vehicle 10, the actuator 112 assists the driver by applying a leaning torque T to supplement the leaning torque resulting from the geometry of the vehicle. In this manner, the driver can effectively lean the vehicle 10 during a turn, with less effort than would ordinarily be required in a free-leaning vehicle, at least at speeds above $v_1$. The sign of $K_s$ is always negative, indicating that the vehicle 10 is countersteered, i.e. the direction of the leaning torque T (and therefore the direction of the turn) is opposite the direction of the steering torque s.

Figure 10D:
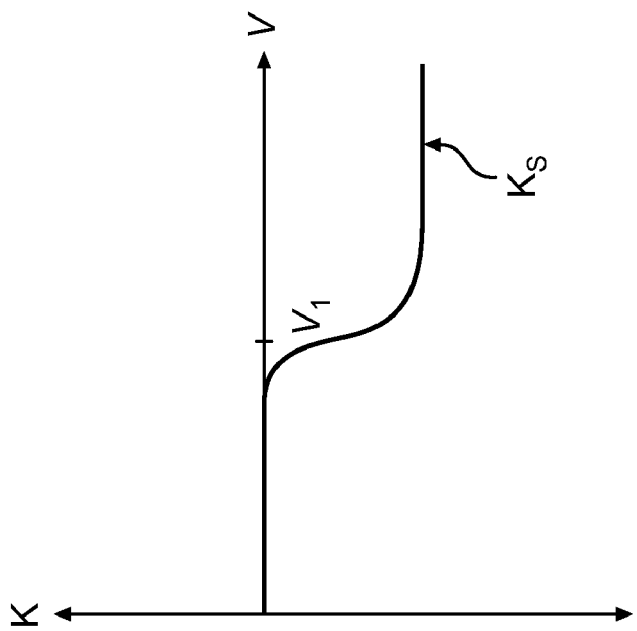
Figure 10C:
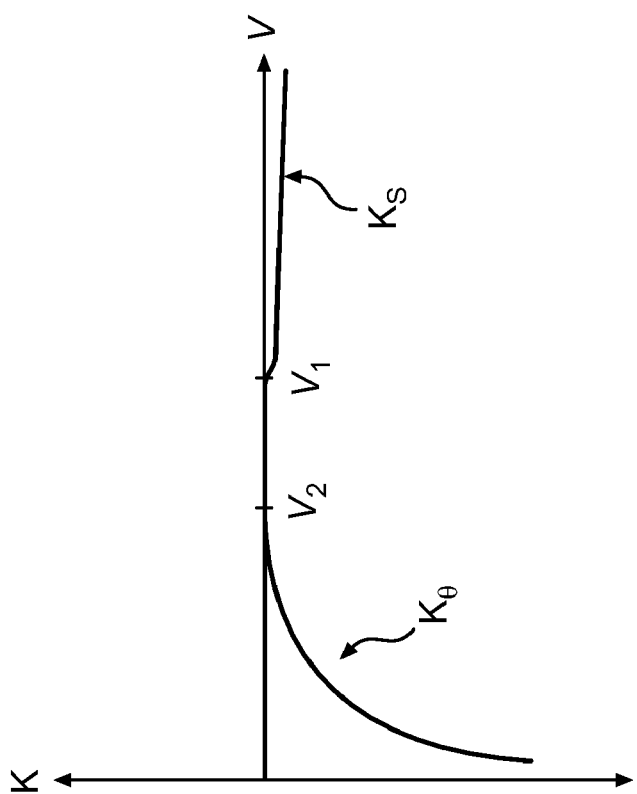

Referring to FIG. 10C, according to a third embodiment $K_\theta$ is similar to the embodiment of FIG. 10A, and provides a restoring torque to limit or prevent leaning at low speeds. In this embodiment, $K_s$ is zero at low speeds, such that the leaning behaviour of the vehicle 10 at low speeds is similar to the embodiment of FIG. 10A. At higher speeds, $K_s$ has a small negative value, such that when the driver exerts a steering torque s on the handlebar 20 the actuator 112 exerts a small leaning torque T that is preferably approximately sufficient to overcome the internal resistance of the actuator 112 and the front suspension assemblies 24, 26 that would normally not be present on a two-wheeled leaning vehicle such as a conventional motorcycle. In this manner, the actuator 112 provides stability against tipping at low speeds, and allows the frame 58 to lean at higher speeds as freely as a motorcycle, but does not actively assist leaning. The map of $K_s$ may optionally be calibrated to duplicate the ride feel of a particular motorcycle, for example a sport motorcycle or a touring motorcycle, by experimentally determining the resistance of the particular motorcycle to leaning at a range of speeds and calibrating the map of $K_s$ accordingly. In this embodiment, the primary leaning torque for leaning the frame 58 of the vehicle 10 into a turn is generated by countersteering and by the geometry of the vehicle 10.

Referring to FIG. 10D, according to a fourth embodiment $K_\theta$ is zero, and provides no restoring torque to limit or prevent leaning at low speeds. In this embodiment, the resistance to leaning at low speeds is provided only by the geometry of the suspension of the vehicle 10, and is generally not sufficient to maintain the frame 58 in an upright position. In this embodiment, $K_s$ is similar to the embodiment of FIG. 10B, resulting in a vehicle 10 that is free-leaning at speeds below $v_1$ and assists leaning at speeds above $v_1$.

In any of the embodiments described above, the control unit 200 may additionally use the signals it receives from the vehicle speed sensor 202, the lateral acceleration sensor 204, and the lean angle sensor 208 to determine whether an undesirable leaning condition is present or imminent. For example, a decrease in vehicle speed or a steering torque applied to the handlebar 20 by the driver may result in the current lateral acceleration of the vehicle 10 being insufficient to maintain the current lean angle, or may render the current lean angle uncomfortable for the riders. In this situation, the control unit 200 may cause the actuator 112 to exert a restoring torque to move the frame 58 toward an upright position or prevent an increase in the lean angle, irrespective of the values of $K_\theta$ and $K_s$ determined from the maps.

It is contemplated that the control unit 200 may allow the driver of the vehicle 10 to select an operating mode from among a plurality of operating modes corresponding to the control maps in FIGS. 10A-10D. In this manner, the driver can select the desired degree of lean assistance and the overall driving experience to be provided by the control unit 200.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A leaning vehicle comprising:
a frame having a front portion and a rear portion;
a straddle seat mounted on the frame;
an engine supported by the frame;
a shock tower having an upper end and a lower end, the lower end of the shock tower being pivotally connected to the front portion of the frame, the frame being pivotable relative to the shock tower about a pivot axis between an upright position and a plurality of leaning positions;
a front left suspension assembly and a front right suspension assembly operatively connected to the front portion of the frame;
a steering assembly adapted to steer the vehicle, the steering assembly having a steering column supported by the frame and a handlebar connected to the steering column; and
a rear suspension connected to the rear portion of the frame,
each front suspension assembly comprising:
a knuckle;
a spindle passing through the knuckle, an upper end of the spindle protruding from the knuckle, a lower end of the spindle protruding from the knuckle, the knuckle being rotatable relative to the spindle about a steering axis;
a lower suspension arm having a first end pivotally connected to the frame and a second end pivotally connected to the lower end of the spindle about a tilting axis, the tilting axis being parallel to the pivot axis; and
a shock absorber having an upper end connected to the shock tower and a lower end connected to the lower suspension arm.

2. The vehicle of claim 1, wherein each knuckle comprises a rearwardly extending steering arm, the steering arm being operatively connected to the steering column.

3. The vehicle of claim 1, wherein each front suspension further comprises a leaning rod having a first end connected to the upper end of the spindle and a second end connected to the frame; and
wherein for each front suspension, pivoting of the frame relative to the shock tower about the pivot axis pivots the spindle in a same direction about the tilting axis.

4. The vehicle of claim 1, further comprising:
a first steering rod having a proximal end operatively connected to the steering column and a distal end connected by a first ball joint to the knuckle of the front right suspension assembly, the first ball joint permitting simultaneous rotation of the knuckle of the front right suspension assembly about the steering axis and the tilting axis of the front right suspension assembly; and
a second steering rod having a proximal end operatively connected to the steering column and a distal end connected by a second ball joint to the knuckle of the front left suspension assembly, the second ball joint permitting simultaneous rotation of the knuckle of the front left suspension assembly about the steering axis and the tilting axis of the front left suspension assembly.

5. The vehicle of claim 1, wherein a brake caliper is fixed to each knuckle.

6. The vehicle of claim 1, further comprising:
a right hub connected to the knuckle of the front right suspension assembly;
a front right wheel connected to the right hub, the front right wheel being rotatable relative to the knuckle of the front right suspension assembly about a right rotation axis;
a left hub connected to the knuckle of the front left suspension assembly;
a front left wheel connected to the left hub, the front left wheel being rotatable relative to the knuckle of the front left suspension assembly about a left rotation axis.

7. The vehicle of claim 6, further comprising:
a first bearing rotatably connecting the knuckle of the front right suspension assembly to the spindle of the front right suspension assembly about the steering axis of the front right suspension assembly, the first bearing being disposed above the right rotation axis;
a second bearing rotatably connecting the knuckle of the front right suspension assembly to the spindle of the front right suspension assembly about the steering axis of the front right suspension assembly, the second bearing being disposed below the right rotation axis;
a third bearing rotatably connecting the knuckle of the front left suspension assembly to the spindle of the front left suspension assembly about the steering axis of the front left suspension assembly, the third bearing being disposed above the left rotation axis; and
a fourth bearing rotatably connecting the knuckle of the front left suspension assembly to the spindle of the front left suspension assembly about the steering axis of the front left suspension assembly, the fourth bearing being disposed below the left rotation axis.

8. The vehicle of claim 6, further comprising:
a right disk brake having an outer periphery connected to the front right wheel, the right disk brake being rotatable with the front right wheel about the right rotation axis;
a right brake caliper disposed at least in part radially inwardly of an inner diameter of the right disk brake, the right brake caliper being adapted to apply a braking force to the right disk brake;
a left disk brake having an outer periphery connected to the front left wheel, the left disk brake being rotatable with the front left wheel about the left rotation axis; and
a left brake caliper disposed at least in part radially inwardly of an inner diameter of the left disk brake, the left brake caliper being adapted to apply a braking force to the left disk brake.

* * * * *